(12) United States Patent
Liu et al.

US011445491B2

(10) Patent No.: US 11,445,491 B2
(45) Date of Patent: Sep. 13, 2022

(54) REDUCED CAPABILITY/COMPLEXITY NR BANDWIDTH PART CONFIGURATION

(71) Applicant: QUALCOMM Incorporated, San Diego, CA (US)

(72) Inventors: Le Liu, Fremont, CA (US); Alberto Rico Alvarino, San Diego, CA (US); Hung Dinh Ly, San Diego, CA (US); Peter Pui Lok Ang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/914,077

(22) Filed: Jun. 26, 2020

(65) Prior Publication Data

US 2021/0029678 A1 Jan. 28, 2021

Related U.S. Application Data

(60) Provisional application No. 62/878,723, filed on Jul. 25, 2019.

(51) Int. Cl.
*H04W 72/04* (2009.01)
*H04L 5/00* (2006.01)

(52) U.S. Cl.
CPC ......... *H04W 72/042* (2013.01); *H04L 5/0048* (2013.01)

(58) Field of Classification Search
CPC ............................ H04W 72/042; H04L 5/0048
See application file for complete search history.

(56) References Cited

U.S. PATENT DOCUMENTS

| 2019/0149421 | A1 | 5/2019 | Jin et al. |
| 2019/0223086 | A1 | 7/2019 | Jung et al. |
| 2020/0252941 | A1* | 8/2020 | Schmidt ............ H04W 72/0413 |
| 2021/0028912 | A1* | 1/2021 | Xu ........................ H04W 4/70 |
| 2021/0352623 | A1* | 11/2021 | Wang .................... H04W 72/10 |

OTHER PUBLICATIONS

International Search Report and Written Opinion—PCT/US2020/040015—ISA/EPO—dated Oct. 6, 2020.
Qualcomm: "NR-Lite for Rel-17 Qualcomm Views", 3GPP RAN #84, RP-190844-NRLITE-R17-QCOM, 3rd Generation Partnership Project (3GPP), Mobile Competence Centre, 650, Route Des Lucioles, F-06921, Sophia-Antipolis Cedex, France, France, No. Newport Beach, Jun. 3, 2019-Jun. 6, 2019, Jun. 2, 2019 (Jun. 2, 2019), XP051746128, 11 pages, Retrieved from the Internet: URL: http://www.3gpp.org/ftp/Meetings%5F3GPP%5FSYNC/RAN/Docs/RP%2D190844%2Ezip [retrieved on Jun. 2, 2019] p. 6, pp. 3-7.

* cited by examiner

*Primary Examiner* — Ronald B Abelson
(74) *Attorney, Agent, or Firm* — Procopio, Cory, Hargreaves & Savitch LLP

(57) ABSTRACT

A configuration to allow a UE to receive a BWP configuration that supports RC NR. The UE sends information to a network indicating a UE capability of the UE. The UE receives, based on the UE capability, information indicating a BWP associated with a first BWP, the second BWP having a frequency range equal to or less than the first BWP. The UE receives at least one of control information or data based on the indicated first BWP and the second BWP.

28 Claims, 11 Drawing Sheets

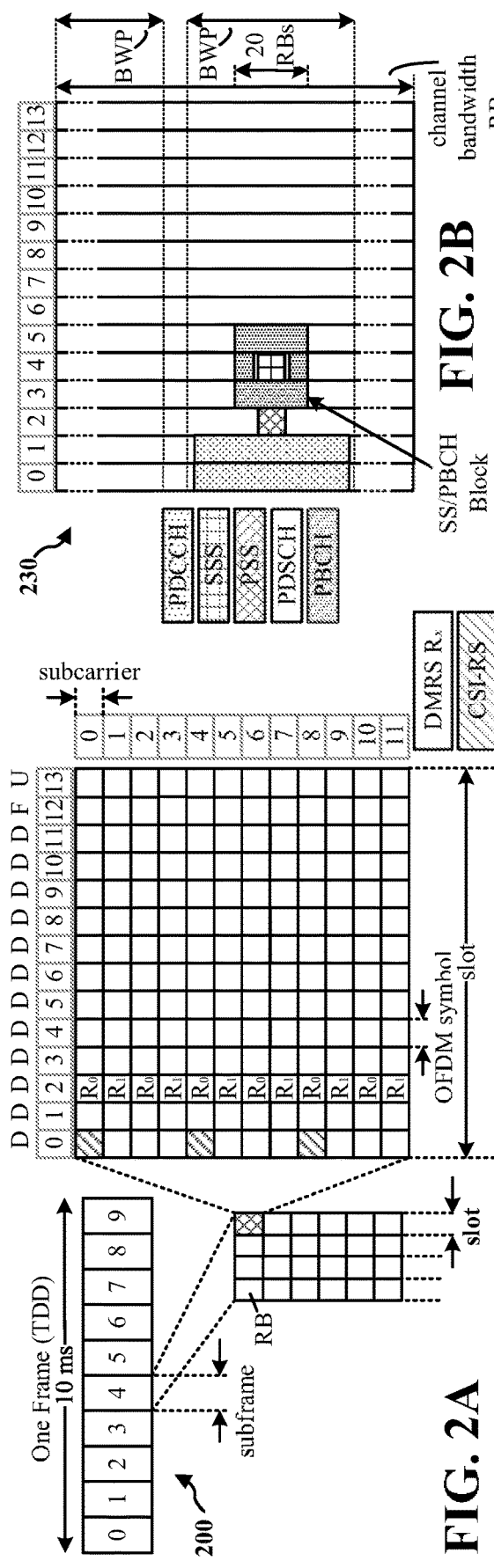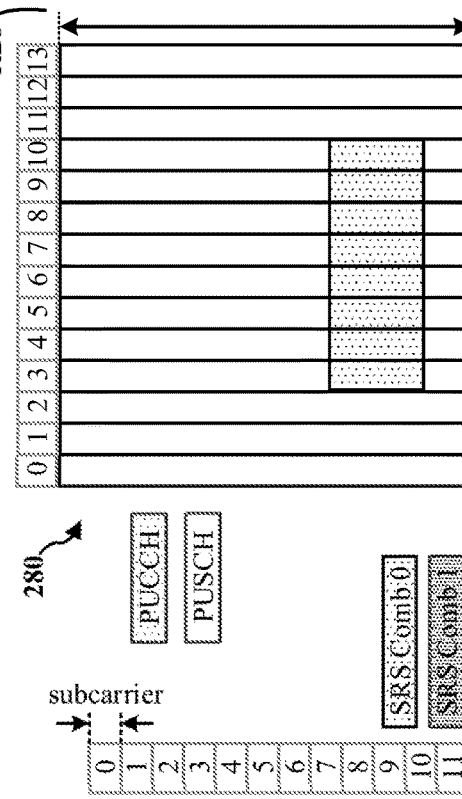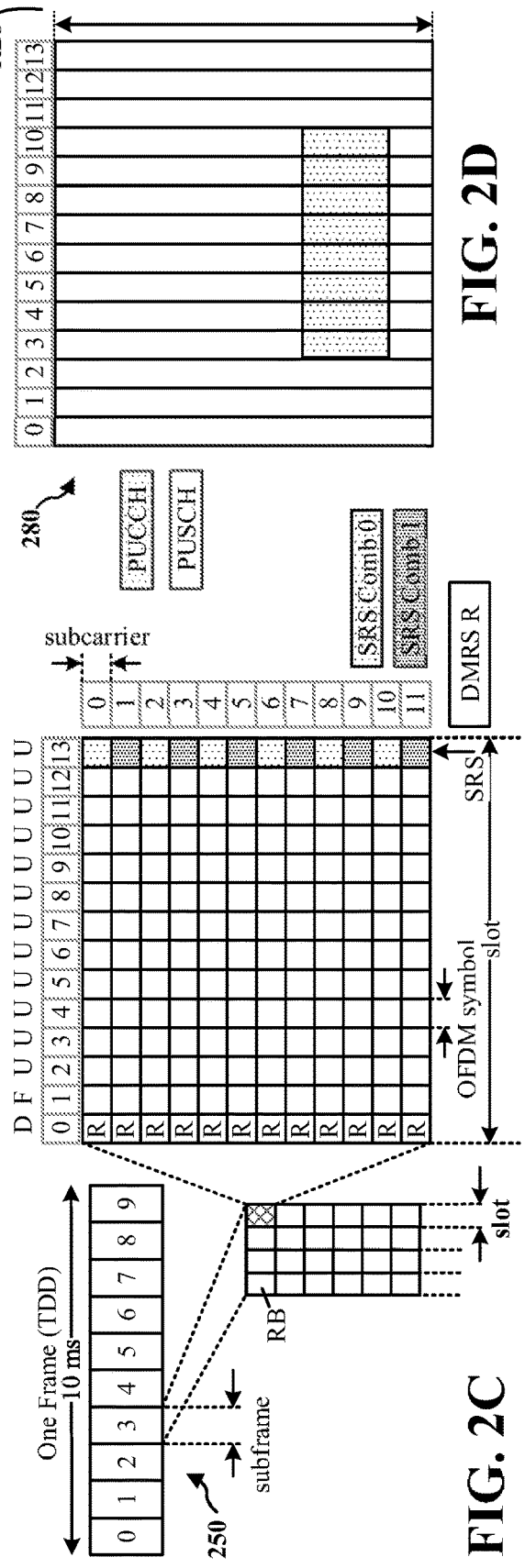
FIG. 2A  FIG. 2B  FIG. 2C  FIG. 2D

SIB1 ::= SEQUENCE {
　...
　* si-SchedulingInfo SI-SchedulingInfo OPTIONAL, -- Need R
　* servingCellConfigCommon ServingCellConfigCommonSIB OPTIONAL, -- Need R
　...
}

SI-SchedulingInfo ::= SEQUENCE {
　schedulingInfoList　　　　　SEQUENCE (SIZE(1..maxSI-Message)) OF SchedulingInfo,
　si-WindowLength　　　　　　ENUMERATED {s5, s10, s20, s40, s80, s160, s320, s640, s1280},
　* si-RequestConfig　　　SI-RequestConfig OPTIONAL,　　-- Cond MSG-1
　* si-RequestConfigSUL　SI-RequestConfig OPTIONAL,　　-- Cond SUL-MSG-1
　* systemInformationAreaID BIT STRING (SIZE(24)) OPTIONAL,　-- Need R
　schedulingInfoList-NRLight　SEQUENCE(SIZE(1..maxSI-Message)) OF SchedulingInfo,
　si-RequestConfig-NRLight　　SI-RequestConfig-NRLight OPTIONAL　-- Cond MSG-1
　si-ResponseBWP-NRLight SEQUENCE (SIZE(1..maxSI-Message)) OF BWP-ID
}

ServingCellConfigCommonSIB ::= SEQUENCE { ... downlinkConfigCommon DownlinkConfigCommonSIB, ... }
DownlinkConfigCommonSIB ::= SEQUENCE {
　frequencyInfoDL FrequencyInfoDL-SIB,
　initialDownlinkBWP BWP-DownlinkCommon,
　initialDownlinkBWPList-NRLight SEQUENCE (SIZE(1..maxLight)) OF BWP-DownlinkCommon, OPTIONAL, -- Need R
　bcch-Config BCCH-Config,
　pcch-Config PCCH-Config, ...
}

FIG. 7

REDUCED CAPABILITY/COMPLEXITY NR BANDWIDTH PART CONFIGURATION

CROSS REFERENCE TO RELATED APPLICATION(S)

This application claims the benefit of U.S. Provisional Application Ser. No. 62/878,723, entitled "NR-Light BWP Configuration" and filed on Jul. 25, 2019, which is expressly incorporated by reference herein in its entirety.

BACKGROUND

Technical Field

The present disclosure relates generally to communication systems, and more particularly, to a reduced capability/complexity new radio (NR) bandwidth part (BWP) configuration.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Reduced capability/complexity (RC) NR may support UE devices such as wearables, smart watches, industrial sensors, and video/surveillance cameras. Such RC NR UE devices may need greater power savings than other non-RC NR UE devices and/or may have more limited capabilities than non-RC NR devices. As such, there is a need for improved designs to facilitate improved communication and performance by RC NR devices.

In an aspect of the disclosure, a method, a computer-readable medium, and an apparatus are provided. The apparatus may be a device at a UE. The device may be a processor and/or a modem at a UE or the UE itself. The apparatus sends information to a network indicating a UE capability of the UE. The apparatus receives, based on the UE capability, information indicating a second bandwidth part (BWP) associated with a first BWP. The second BWP may have a frequency range equal to or less than the first BWP. The apparatus receives at least one of control information or data based on the indicated first BWP and the second BWP. Non-RC NR UE devices may utilize the first BWP when receiving data and/or control information from the base station. RC NR UE devices may utilize the second BWP and a portion of the first BWP when receiving data and/or control information from the base station. RC NR UEs may receive at least one of control information or data based on the indicated first BWP and the second BWP. RC NR UEs may have more limited capabilities than the non-RC NR UEs, and therefore may need the potentially smaller bandwidth second BWP to receive control information and/or data, or may need the power savings offered through the utilization of the second BWP rather than the first BWP when receiving control information and/or data.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G NR frame, DL channels within a 5G NR subframe, a second 5G NR frame, and UL channels within a 5G NR subframe, respectively.

FIG. 7 is a diagram illustrating an exemplary system information block (SIB) 1 (SIB1).

DETAILED DESCRIPTION

Figure 1:
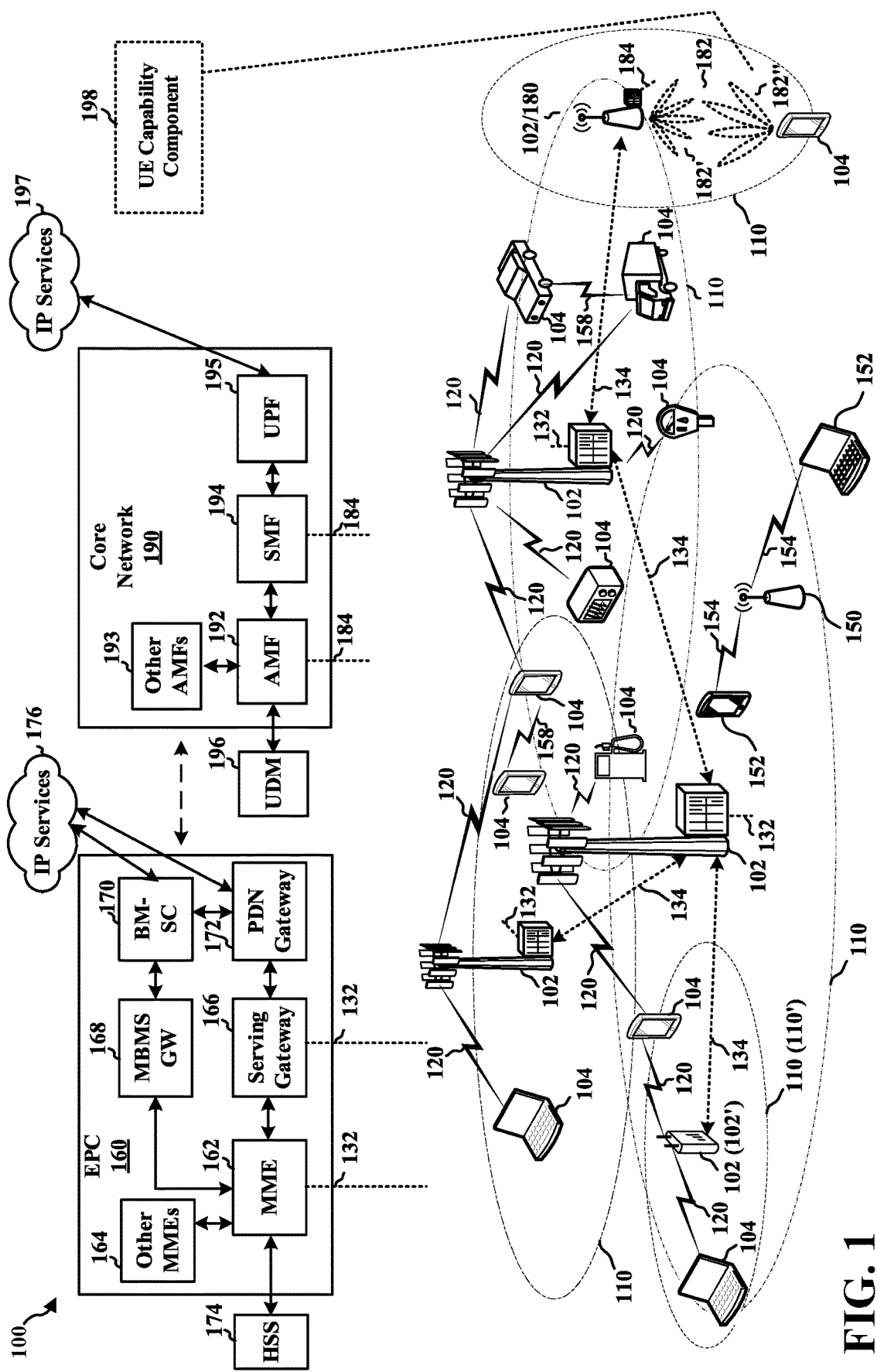
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Frequency range bands include frequency range 1 (FR1), which includes frequency bands below 7.225 GHz, and frequency range 2 (FR2), which includes frequency bands above 24.250 GHz. Communications using the mmW/near mmW radio frequency (RF) band (e.g., 3 GHz-300 GHz) has extremely high path loss and a short range. Base stations/UEs may operate within one or more frequency range bands. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to receive a BWP configuration that supports RC NR, based on capabilities of the UE 104. For example the UE 104 may include a UE capability component 198 configured to send information to a network, via base station 102/180, indicating the UE capability of the UE 104. The UE 104 may be configured to send information to a network indicating a UE capability of the UE, such as UE max BW size, number of rx antennas, tx power, etc. In addition, the UE 104 may be configured to receive, based on the UE capability, information indicating a second BWP associated with a first BWP, where the second BWP has a frequency range equal to or smaller than the first BWP. The BW size of the second BWP may be equal to or smaller than the size of the UE max BW. Further, the UE 104 may receive at least one of control information or data based on the indicated first BWP and the second BWP.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) ACK/NACK feedback. The PUSCH carries data, and may additionally be used to carry a buffer status report (BSR), a power headroom report (PHR), and/or UCI.

Figure 3:
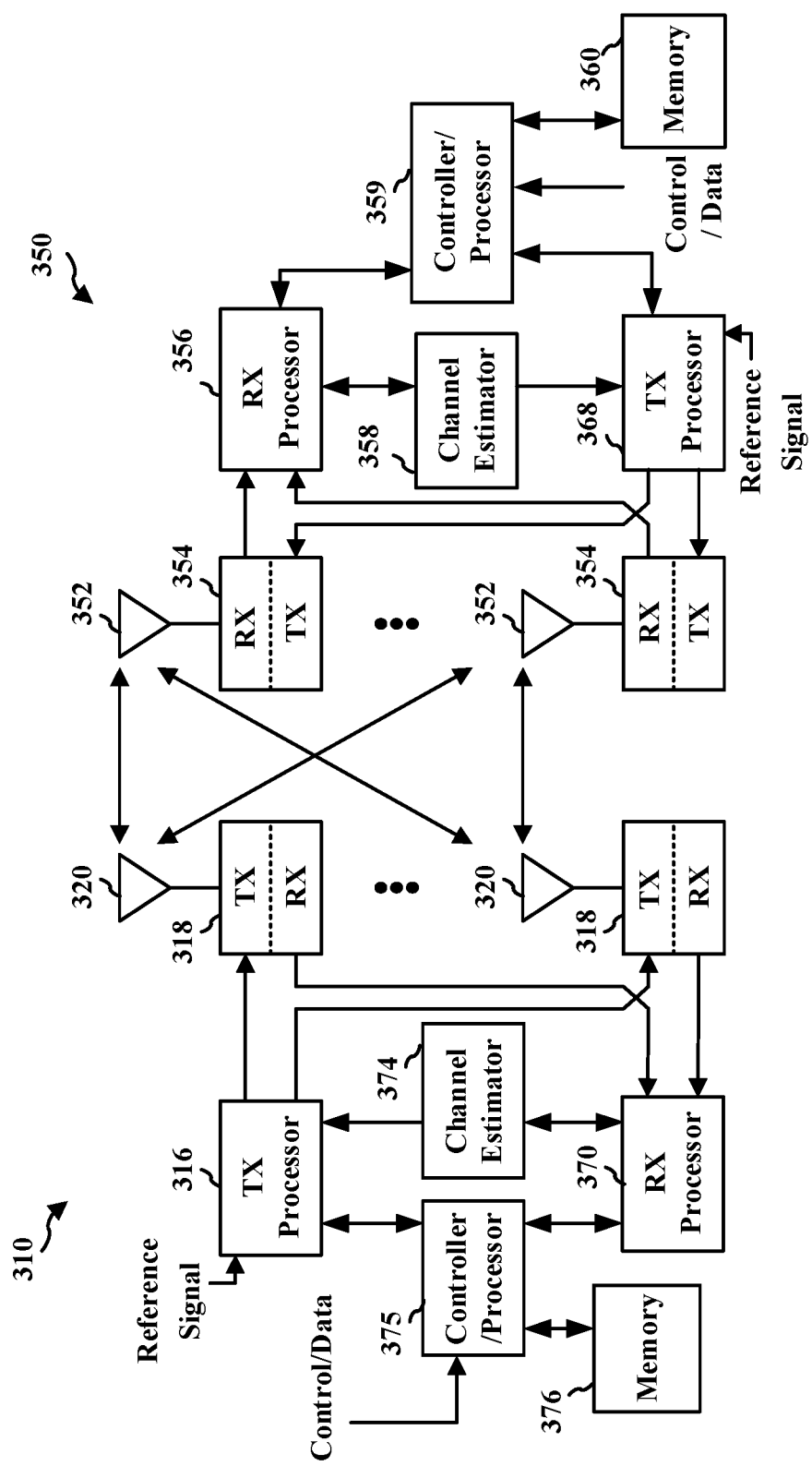
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

NR may support UEs configured with eMBB and URLLC. RC NR may support UE devices such as wearables, smart watches, industrial sensors, and video/surveillance cameras. RC NR UEs may have a reduced device complexity as compared to high-end eMBB and URLLC devices. In addition, RC NR UEs may be configured to have a compact form factor, as well as being configured to support all frequency range (FR) 1/FR2 bands for FDD and TDD. In some instances, RC NR UEs may be utilized as industrial wireless sensors, having communication service availability of 99.99% and end-to-end latency of less than 100 ms (e.g., 5-10 ms for safety related sensors). RC NR UEs may have a reference bit rate of less than 2 Mbps, with heavy uplink traffic. RC NR UEs may be stationary or mobile, and may have a battery life of at least a few years. RC NR UEs may also be utilized in video surveillance settings, and may have a video bitrate of 2-4 Mbps, a latency of 500 ms or less. In some instances, RC NR UEs may provide high-end video having video bitrate of 2-4 Mbps. Some RC NR UEs (e.g., wearable devices) may have a bitrate of approximately 10 Mbps or higher downlink and approximately 5 Mbps or higher uplink. As discussed above, the RC NR UE may have more limited capabilities than the non-RC NR UEs, and therefore may need a limited bandwidth to receive control information and/or data, or may need the power savings offered through the utilization of a limited bandwidth when receiving control information and/or data. Challenges in RC NR UE design include a potentially limited band on which the UE may operate and low complexity requirements. For example, RC NR UEs may only support bandwidths of 5 MHz, 10 MHz, or 20 MHz, rather than 100 MHz of non-RC NR UEs. The supported bandwidth of RC NR UEs may be at least the bandwidth of a synchronization signal block (SSB), and therefore RC NR UEs may receive the same SSB that non-RC NR UEs receive. Challenges in RC NR UE design may further include a lower transmit maximum power (e.g., 20 dBm or 14 dBm rather than 23 dBm), less number of receive antennas (e.g., one or two receive antennas instead of four receive antennas), greater power savings/battery life requirements (e.g., 1-5 years), a more flexible mobility, and coexistence with eMBB, URLLC, LTE narrowband (NB) IoT/MTC.

Figure 4:
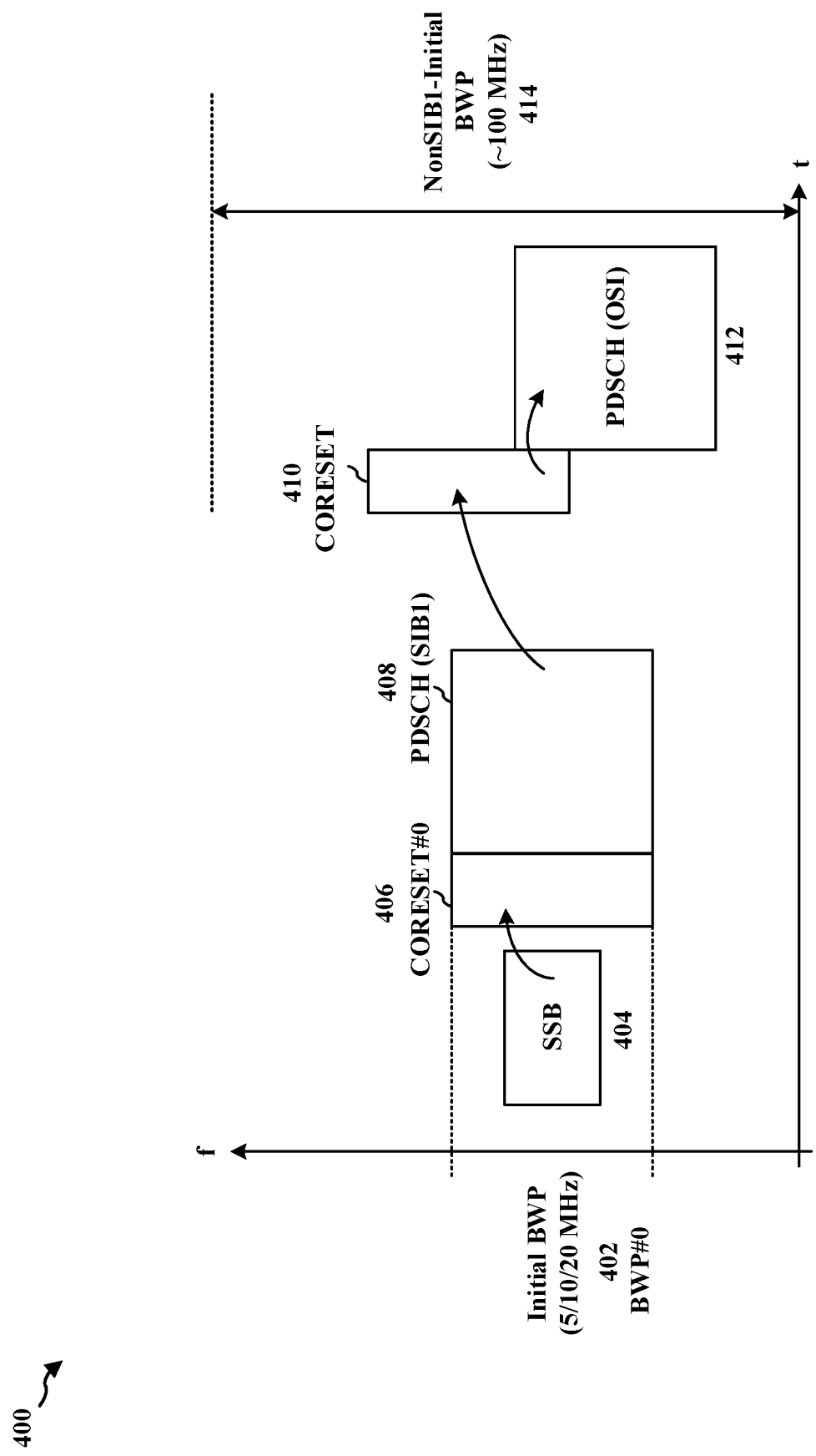
FIG. 4 is a diagram illustrating a first exemplary configuration for a plurality of BWPs.

FIG. 4 is a diagram 400 illustrating a first exemplary configuration for a plurality of BWPs. The system information (e.g., SIB1) initial BWP (BWP #0) 402 may be indicated in a MIB. The SSB 404 may be within the initial BWP 402. The CORESET #0 406 BW may be equal to that of BWP #0 402. A PDSCH 408 carrying system information (e.g., SIB1) may be scheduled within a BWP #0 402. Both the CORESET 406 and the PDSCH 408 may be quasi co-located (QCLed) with the SSB 404. A NonSIB1-initialBWP 414 (e.g., the initial BWP for the additional system information other than SIB1) may be indicated in the system information (408). The system information may indicate whether additional system information (referred to as other system information (OSI)) to be transmitted is broadcast or non-broadcast (e.g., dedicated) OSI. The CORESET 410 configured in the NonSIB1-initialBWP 414 is used for the UE to monitor the PDCCH 410 for OSI within a PDSCH 412. The PDSCH 412 carrying OSI can be scheduled within the NotSIB1-initialBWP 414. The CORESET 410 and the PDSCH 412 may be configured by a different transmission configuration indicator (TCI) state than the SSB 402. With respect to BWP for RRC connected UEs (e.g., UE is in an RRC connected state), one or more BWPs may be configured by unicast RRC signaling.

Referring again to FIG. 4, a UE may receive a MIB that indicates a location and size of an initial BWP 402 (referred to as BWP #0 in FIG. 4). A UE may receive an SSB 404 within the initial BWP 402. The SSB 404 may indicate a location of a control resource set (CORESET) 406 (referred to as CORESET #0 in FIG. 4). A CORESET may include the search space for a PDCCH. Within the CORESET 406, a UE may receive a PDCCH that includes DCI. The DCI may include scheduling information (a modulation and coding scheme (MCS), RB allocation, etc.) for receiving a PDSCH 408 that includes system information (e.g., SIB1). The SSB 404 may be time division multiplexed (TDMed)/frequency division multiplexed (FDMed) with the CORESET 406/PDSCH 408. The CORESET 406 and the PDSCH 408 may be QCLed (e.g., have roughly the same channel not including the phase) with the SSB 404. The system information may provide information indicating the location of the CORESET 410 and whether, through the CORESET 410, the UE may obtain broadcast or non-broadcast OSI. The UE may monitor for a PDCCH within the CORESET 410 for receiving the OSI. Within the CORESET 410, a UE may receive a PDCCH that includes DCI. The DCI may include scheduling information for receiving a PDSCH 412 that includes the OSI, such as system information that is included in SIBs x, where x>1 (e.g., non-SIB1 SIBs including SIB2, SIB3, SIB4, etc.). A UE may receive the CORESET 410 and the PDSCH 412 within a non-SIB1 Initial BWP 414, which may be 100 MHz, for example. The non-SIB1 Initial BWP 414 indicated by SIB1 may be larger than the initial BWP 402. If no configuration in SIB1, the non-SIB1 Initial BWP 414 is by default same as the initial BWP 402.

There may be challenges of the RC NR design with fitting into the framework as discussed with respect to FIG. 4. The challenges include a limited band and low complexity for RC NR UEs, that RC NR UEs require coverage compensation due to the limited band and limited number of receive antennas, and the high PDCCH capacity to support a large number of RC NR UEs. RC NR UEs may access the legacy NR 5G network, but with reduced flexibility of existing features. For the future NR 5G network, new design/signaling may be introduced. Such design may improve coverage by combining new signals and part of the legacy signals for the system information. Further, such design may allow for the transmission of new signals with backward compatibility and improve the spectrum efficiency with minimized impact on legacy UEs (e.g., the reception of OSI).

Figure 5:
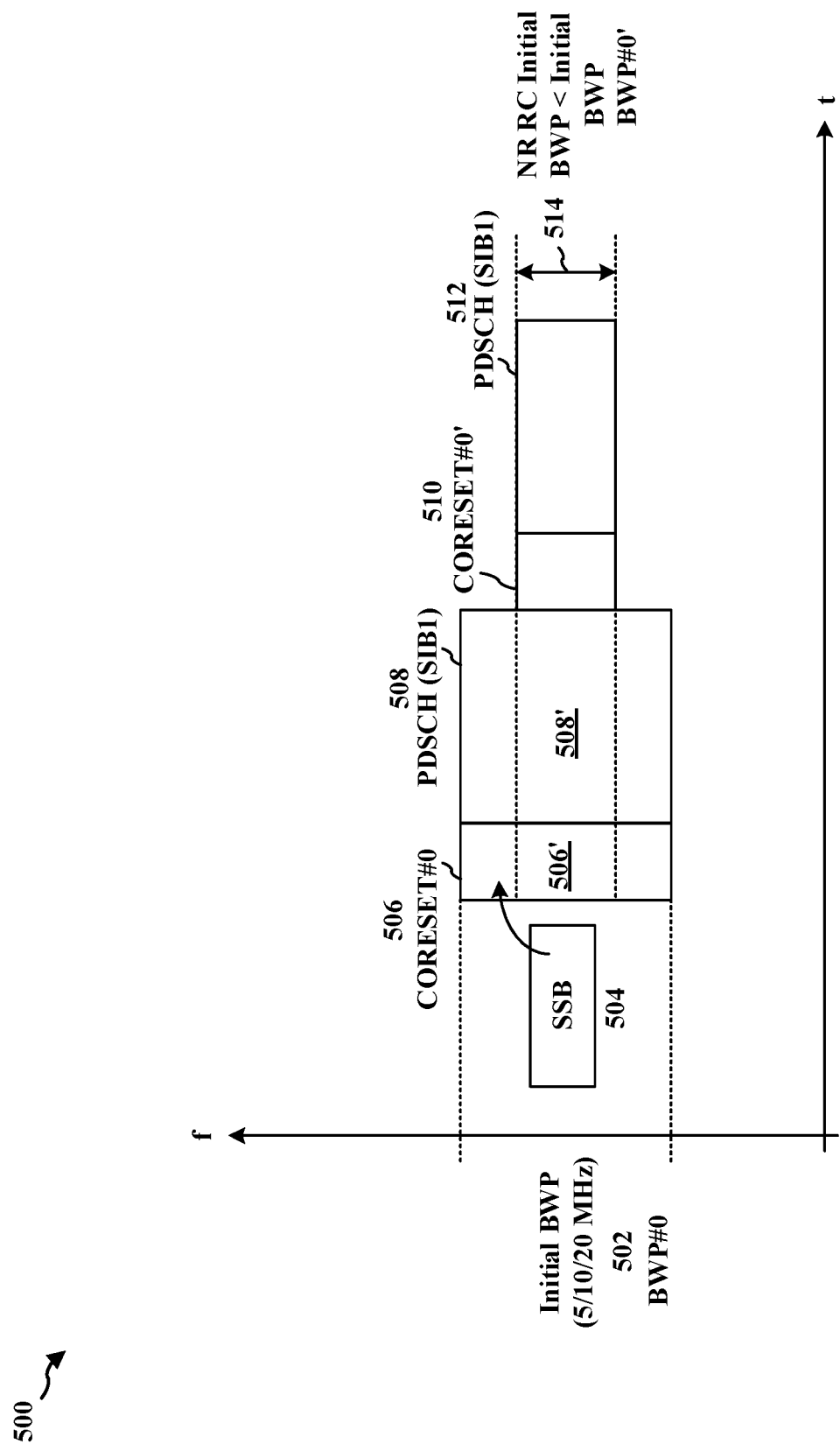
FIG. 5 is a diagram illustrating a second exemplary configuration for a plurality of BWPs.

FIG. 5 is a diagram 500 illustrating a second exemplary configuration for a plurality of BWPs. A RC NR initial BWP (BWP #0') 514 may be defined for a system information (e.g., SIB1) using predefined resources based on an SSB ID of the SSB 504 within the initial BWP (BWP #0) 502. One RC NR initial BWP 514 may be configured within the initial BWP 502 per the SSB 504. The CORESET #0' 510 bandwidth may be same as that of BWP #0' 514. The CORESET #0 in BWP #0 502 and CORESET #0' in BWP #0' 514 are both QCLed with SSB 504. A PDSCH 512 carrying an additional system information may be scheduled by the PDCCH in the CORESET #0' 510 within the RC NR initial BWP 514. RC NR UEs may monitor the TDMed CORESET #0' 510/SIB1 512 and part of the CORESET #0 506'/SIB1 508' for combining. There may be no limitation on the distributed pattern of the legacy CORESET #0 506/SIB1 508, e.g., the PDSCH carrying SIB1 in BWP #0 can be distributed in BWP #0, with only a subset of BWP #0 in the same frequency range as that of BWP #0'. The BWP #0' and BWP #0 may be TDMed (e.g., in FR1/FR2) or FDMed (e.g., in FR1) with predefined mapping relationship. Different RC NR initial BWPs 514 for different SSBs may also be TDMed (e.g., in FR1/FR2) or FDMed (e.g., in FR1). RC NR UEs may need to blindly detect RC NR initial BWP (BWP #0') 514 for SIB1 detection assuming the predefined resource mapping relationship (e.g., RB/slot location) relative to BWP #0, under some predefined condition (e.g., only if BW of BWP #0 502>BW of BWP #0' 514, the number of the receive antennas is less than 4, and/or signal to interference plus noise ratio (SINR) based on the PBCH is lower than X dB).

Referring again to FIG. 5, a UE may receive a MIB that indicates a location and size of an initial BWP 502 (referred to as BWP #0 in FIG. 5). A UE may receive an SSB 504 within the initial BWP 502. The SSB 504 may also be within a light initial BWP 514. The SSB 504 may indicate a location of a CORESET 506 (referred to as CORESET #0 in FIG. 5). Within the CORESET 506, a UE receives at least a portion of a PDCCH 506' that includes DCI. The DCI includes scheduling information for receiving a PDSCH 508 that includes system information (e.g., SIB1). Although the UE receives just a portion of the PDCCH 506', the UE may be able to obtain the DCI due to the low coding rate/ redundancy bits. Based on the DCI, the UE receives a portion of the PDSCH 508'. The UE subsequently decodes the PDSCH 508' to obtain the system information (e.g., SIB1). Although the UE receives just a portion of the PDSCH 508', the UE may be able to obtain the system information (e.g., SIB1) within the PDSCH due to the low coding rate (e.g., ⅓)/redundancy bits. Both portions of the PDCCH 506' and the PDSCH 508' are within the light initial BWP 514, which is the extent of the available bandwidth available to the UE (which is a RC NR UE). Based on the location of the BWP #0, the UE may determine, infer, or use blind detection to receive a PDCCH within a CORESET 510 (referred to as CORESET #0' in FIG. 5). Within the CORESET 510, a UE receives a PDCCH that includes DCI. The DCI includes scheduling information for receiving a PDSCH 512 that includes a system information (e.g., SIB1). Based on the DCI, the UE receives the PDSCH 512 including the system information (e.g., SIB1). The system information of the PDSCHs 508', 512 may be identical. Both the CORESET 510 (including the PDCCH) and the PDSCH 512 are within the light initial BWP (BWP #0') 514. In one configuration, the CORESET 510 and the PDSCH 512 have the same bandwidth as the light initial BWP 514. In one configuration, the light initial BWP 514 spans a frequency range less than or equal to the initial BWP 502. In another configuration, as illustrated in FIG. 5, the light initial BWP 514 spans a frequency range less than the initial BWP 502.

In one configuration, the CORESET 510 and the PDSCH 512 may span more symbols/time duration than the CORESET 506 and the PDSCH 508. Specifically, as the PDSCH 512 may contain the same system information as the PDSCH 508, the PDSCH 512 may span more symbols/time duration than the PDSCH 508 to account for the smaller bandwidth, assuming the PDSCH 512 has a smaller bandwidth than the PDSCH 508. Further, if the CORESET 510 contains the same or nearly the same DCI information (e.g., at least sharing some common information) as the DCI in the CORESET 506, the CORESET 510 may span more symbols than the CORESET 506 to account for the smaller bandwidth, assuming the CORESET 510 has a smaller bandwidth than the CORESET 506.

After receiving the system information (e.g., SIB1) in each of the PDSCH 508' and the PDSCH 512, the UE may decode each of the PDSCHs to obtain two respective system information, which as mentioned above, may include identical system information. The UE may then combine the decoded system information to obtain a single system information (e.g., log likelihood ratio (LLR) combining). In such a configuration, the UE is better able to successfully detect the system information (e.g., SIB1), with less latency.

As discussed above, the UE may combine the system information. The UE may also combine the DCI or portions of a first DCI with a second DCI to obtain one DCI. In such configurations, the UE may be configured to recover the system information (e.g., SIB1) within the PDSCH and the DCI within the PDCCH in the CORESETs. With respect to combining at the UE, for channel estimation, besides utilizing the QCL nature of the associated SSB, the UE may be able to assume DMRS association between CORESET #0 506'/PDSCH 508' in the BWP #0 502 and the CORESET #0' 510/PDSCH 512 in the BWP #0' 514 (e.g., if DMRS within BWP #0 and DMRS within BWP #0' are transmitted from same antenna port(s) using same transmission schemes). The DMRS association allows for the UE to combine DMRS for channel estimation (e.g., coherent combining). For example, the UE may combine the DMRS in the CORESET 506' with the DMRS in the CORESET 510 when estimating the channel before decoding the DCI in the CORESETS 506', 510. For another example, the UE may combine the DMRS in the PDSCH 508' with the DMRS in the PDSCH 512 when estimating the channel before decoding the system information (e.g., SIB1) in the PDSCH 508', 512. For system information (e.g., SIB1), the UE may combine the PDSCH carrying system information in the BWP #0 502 and the BWP #0' 514. For PDCCH, in a first configuration, PDCCH combining is enabled. If DCI bits (or at least some common fields) in the PDCCH of CORESET #0 506' and the CORESET #0' 510 are the same, PDCCH combining may be enabled. Only the common DCI bits may be combined. This may limit the same resource allocation for PDSCH in BWP #0 502 and BWP #0' 514. If DCI bits in CORESET #0 506' and CORESET #0' 510 are independent, PDCCH combining may be disabled.

Figure 6:
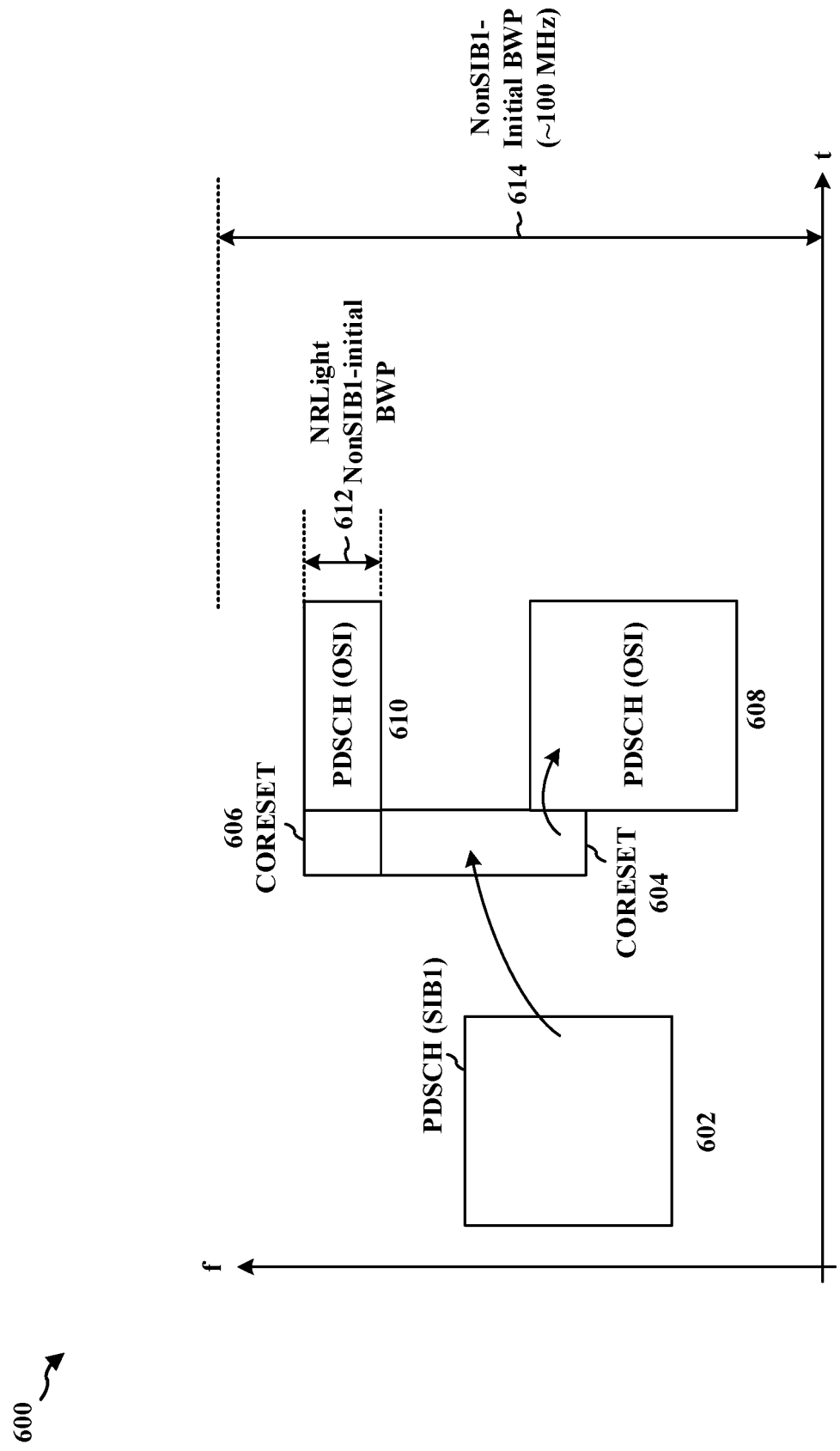
FIG. 6 is a diagram illustrating a third exemplary configuration for a plurality of BWPs.

FIG. 6 is a diagram 600 illustrating a third exemplary configuration for a plurality of BWPs. RC NR BWP 612 for OSI 610 for RC NR UEs may be defined with the configuration indicated by the system information (e.g., SIB1) 602 (e.g., see 508', 512). More than one RC NR NonSIB1-initialBWP 612 (number of N) can be configured for OSI 610 for RC NR UEs. For example, there may be a maximum of 20 RC NR NonSIB1-initialBWPs 612 of 5 MHz in NonSIB1-initialBWP 614 of 100 MHz, non-overlapped in frequency, if concurrent in time. In one example, one RC NR BWP 612 can be used for broadcast OSI, monitored by all RC NR UEs, and a remaining N-1 RC NR BWPs 612 may be used for non-broadcast SIB (on-demand). The RC NR BWP for broadcast OSI may have the BW size set as the minimum supporting BW size of all the RC NR UEs. The system information (e.g., SIB1) 602 may indicate the mapping relationship between RC NR NonSIB1-initialBWPs 612 and each type of system information. For example, a UE may receive a system information (e.g., SIB2) through one of the N-1 RC NR BWPs, and a system information (e.g., SIB3) through another of the N-1 RC NR BWPs. This may be applied to RC NR paging using the configuration of one or more than one BWP, in a similar way. A UE may select one of multiple BWPs for RC NR UEs based on predefined mapping relationship, e.g., UE ID, for load balancing. RC NR BWP 612 for OSI 610 may have different bandwidth sizes, and can be inside or outside the legacy NonSIB1-initialBWP 614. For example, the BWP may be larger to receive the SIB for RC NR UE(s) supporting larger BW. The light BWP for the on-demand SIB may be scheduled/selected by RAR (random access response) after receiving the request from a RC NR UE.

Referring again to FIG. 6, the UE receives a system information (e.g., SIB1) 602 (see also 508', 512 and related discussion). Based on the information in the system information, the RC NR UE determines the location of the CORESET 606. Non-RC NR UEs may determine the location of the CORESET 604, and thereafter obtain the PDSCH 608 including the OSI. RC NR UEs may decode the PDCCH within the CORESET 606 to obtain the DCI, and based on the DCI, receive the PDSCH 610, and decode the PDSCH 610 to obtain the OSI. The CORESET 606 and the PDSCH 610 are within the light nonSIB1-initial BWP 612.

The RC NR CORESET 606 for OSI 610 may be configured in the associated RC NR NonSIB1-initialBWP 612 (expect frequency hopping (FH)). PDSCH 610 may be scheduled within the same BW as RC NR CORESET 606. With respect to the RC NR CORESET 606 for RC NR BWP 612 vs. the legacy CORESET 604 for the legacy BWP 614, if such PDCCH searching spaces for CORESETS 606, and 604 are overlapped in TDM/FDM, then the configured ID for system information, RA, and paging should be different for legacy UEs and RC NR UEs. In case of TDM in FR1/FR2 or FDM in FR1, the TCI-state for the RC NR CORESET 606 and the legacy CORESET 604 can be different if configured independently (same by default if no additional TCI-state configuration for RC NR CORESET). The UE may perform OSI combining for coverage extension. If TDMed PDSCH carries the same contents of OSI (e.g., for broadcast OSI), the UE may be able to combine OSI for coverage extension. For example, a UE may combine the OSI in the PDSCH 610 with subsequently received OSI in a PDSCH. In one configuration, if the PDSCH 608 is non-concurrent in time with the PDSCH 610, a UE may obtain a portion of the PDSCH 608 based on its light nonSIB1-initial BSP 612, and also obtain the PDSCH 610, and then combine the PDSCH 610 and the portion of the PDSCH 608 to obtain the OSI. Also, the UE may perform DMRS combining for enhanced channel estimation as well, assuming DMRS association between light NonSIB1-initialBWP and NonSIB1-initialBWP. In some aspect, the Light NonSIB1-initialBWP may be implicitly configured by using CORESET configuration for RC NR UEs. The PDSCH scheduling by the PDCCH in the CORESET for RC NR UEs is limited within the same BW of the CORESET.

FIG. 7 is a diagram 700 illustrating an exemplary system information (e.g., SIB1). The system information may include the additional system information in the dotted boxes, with the information 702 providing separate scheduling information for RC NR broadcast or non-broadcast OSI, and the information 704 providing a list of RC NR nonSIB1-initial BWPs for RC NR.

Figure 8:
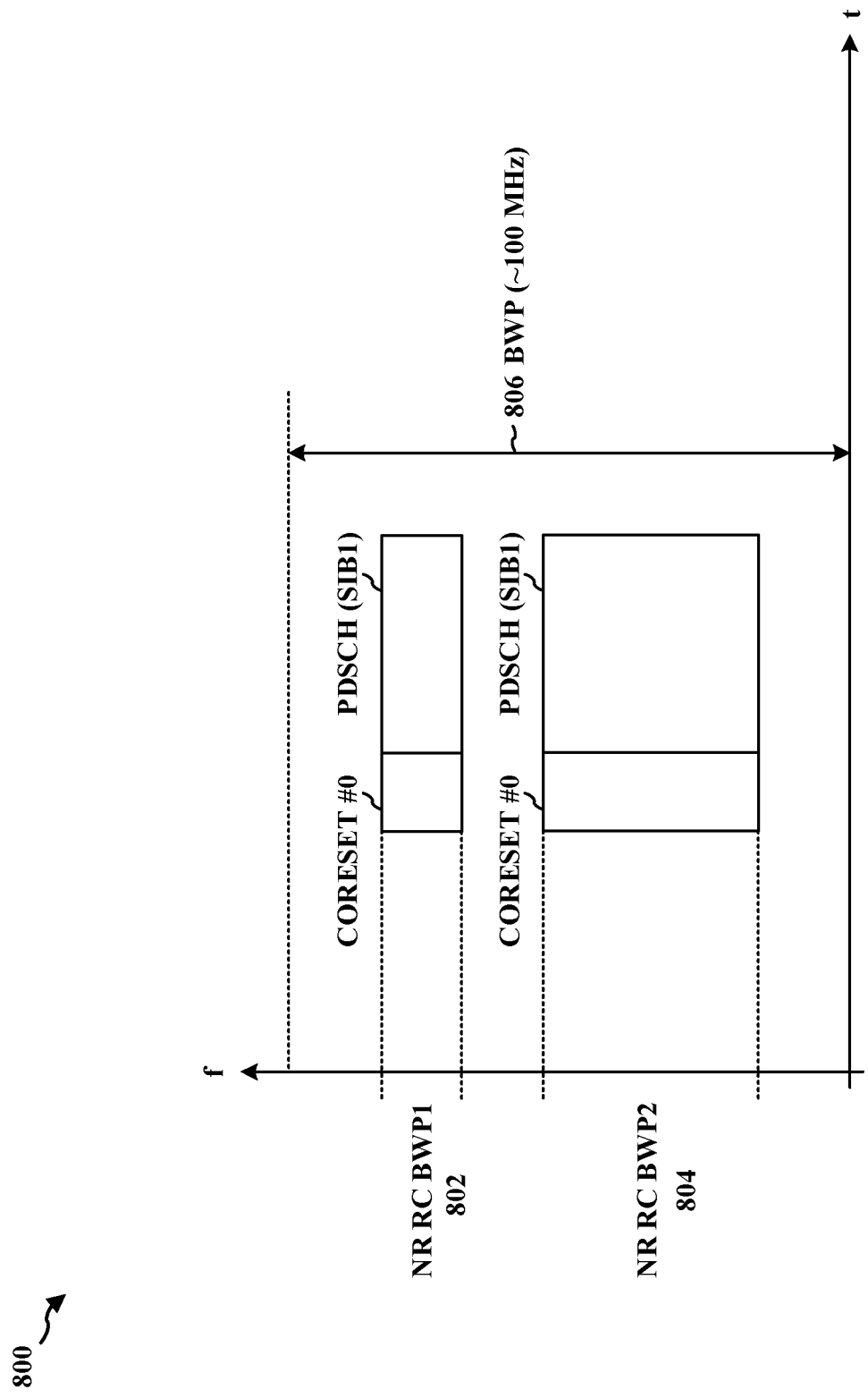
FIG. 8 is a diagram illustrating a fourth exemplary configuration for a plurality of BWPs.

FIG. 8 is a diagram 800 illustrating a fourth exemplary configuration for a plurality of BWPs. Such configuration may apply to UEs in an RRC connected state. RC NR BWPs 802, 804 for unicast data may be configured for RRC connected RC NR UEs. In one configuration, N RC NR BWPs may be configured for RRC RC NR UEs. For example, N may be up to 20 if each RC NR BWP is 5 MHz and such BWPs are non-overlapping (e.g., not concurrent in time or frequency) and FDM within a legacy BWP 806 of 100 MHz. In one configuration, a UE may receive an explicit indication of an RC NR BWP to use by unicast RRC signaling. The RC NR BWP may be a UE-specific BWP based on a UE capability of a supporting BW size. For example, a first UE with a lower or reduced UE capability may be assigned the light BWP1 802, while a second UE with a higher or increased UE capability may be assigned the light BWP2 804. Alternatively, a UE may receive an implicit indication of an RC NR BWP to use by using its CORESET configuration. The RC NR CORESET may be configured no larger than the BW based on UE capability. PDSCH may be scheduled within the bandwidth of the RC NR CORESET.

The RC NR uplink BWP may also be configured. For RRC idle UEs, the system information (e.g., SIB1) for the RC NR uplink BWP may further include an uplink common configuration specific for RC NR, in addition to conventional uplink and downlink common configurations for non-RC NR.

For RRC connected UEs, the configuration may be indicated by unicast RRC signaling. In one configuration, UEs may receive an explicit indication of RC NR UL BWP by unicast RRC signaling. The RC NR BWP may be a UE-specific BWP based on UE capability of supporting UL BW size. In one configuration, UEs may receive an implicit indication of an RC NR UL BWP by using its DL CORESET configuration if TDD. The RC NR CORESET may be configured no larger than the BW based on the UE capability. PUSCH/PUCCH may be scheduled within the bandwidth of the RC NR DL CORESET.

Figure 9:
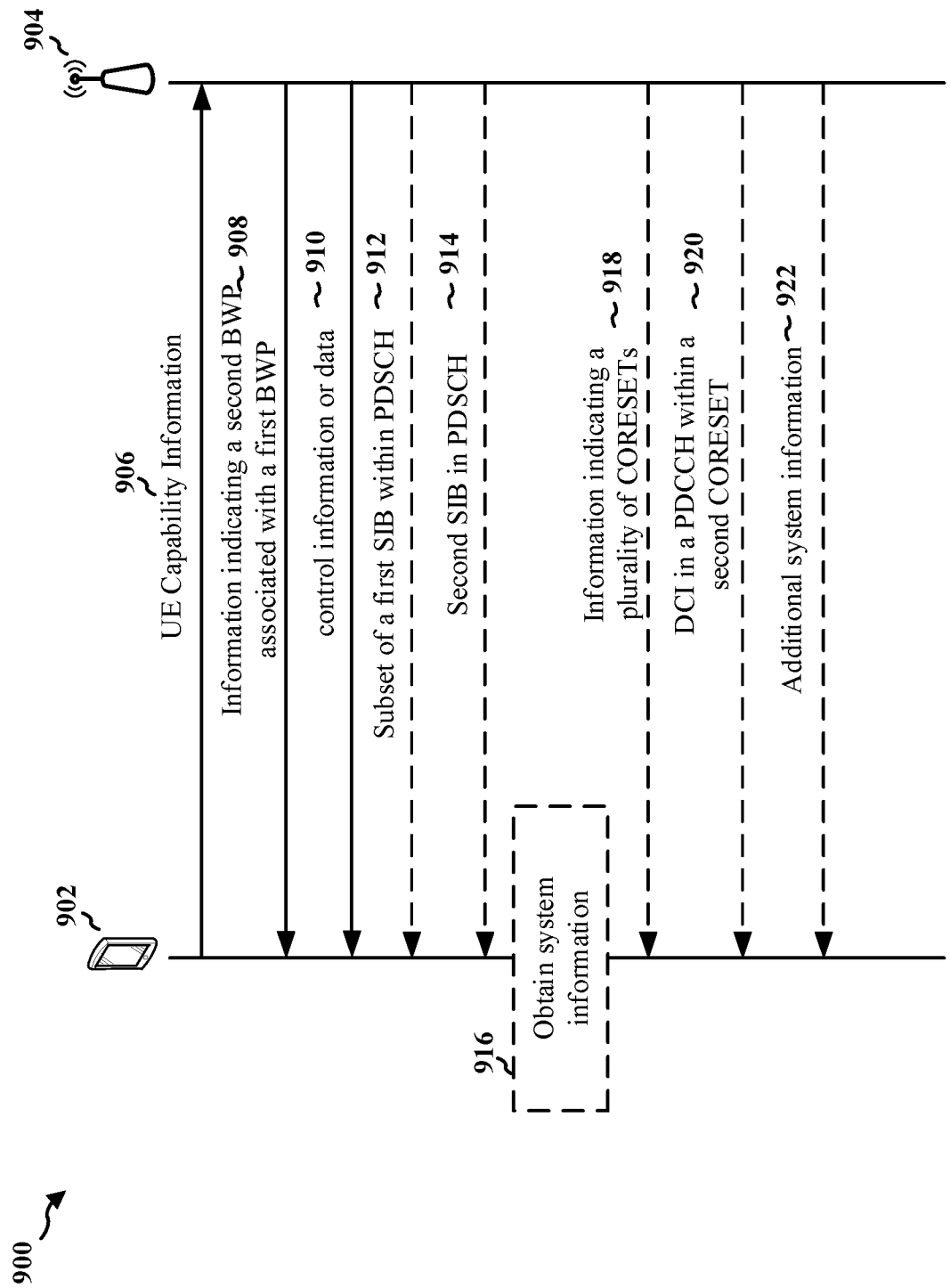
FIG. 9 is a call flow diagram of signaling between a UE and a base station in accordance with certain aspects of the disclosure.

FIG. 9 is a call flow diagram 900 of signaling between a UE and a base station in accordance with certain aspects of the disclosure. The diagram 900 of FIG. 9 includes a UE 902 and a base station 904. The base station 904 may be configured to provide a cell. The UE 902 may be configured to communicate with the base station 904. For example, in the context of FIG. 1, the base station 904 may correspond to base station 102/180 and, accordingly, the cell may include a geographic coverage area 110 in which communication coverage is provided and/or small cell 102' having a coverage area 110'. Further, a UE 902 may correspond to at least UE 104. In another example, in the context of FIG. 3, the base station 904 may correspond to base station 310 and the UE 902 may correspond to UE 350. Optional aspects are illustrated with a dashed line.

As illustrated at 906, the UE 902 may send information indicating a UE capability. The UE may send the information indicating the UE capability to a network. The information may indicate that the UE capability is a type of UE with RC. The UE may send the information indicating the UE capability to the network via a base station.

As illustrated at 908, the base station 904 may send information indicating a second BWP associated with a first BWP. The UE 902 may receive the information indicating a second BWP associated with a first BWP. The UE 902 may receive the information indicating the second BWP based on the UE capability. The second BWP may have a frequency range that may be equal to or less than the first BWP.

As illustrated at 910, the base station 904 may send at least one of control information or data. The UE 902 may receive the at least one of control information or data. The UE 902 may receive the at least one of the control information or the data based on the indicated first BWP and the second BWP. In some aspects, to receive the at least one of the control information or the data based on the indicated first BWP and the second BWP, the UE 902 may receive DCI in a PDCCH within a CORESET. The CORESET may be within the second BWP. The UE 902 may also receive, based on the received DCI, data in a PDSCH within the second BWP.

In some aspects, for example at 912, the base station 904 may send a subset of a first SIB within a PDSCH. The UE 902 may receive a subset of a first SIB within a PDSCH. The first SIB may be within the first BWP. The subset of the first SIB may be within the second BWP.

In some aspects, for example at 914, the base station 904 may send a second SIB in the PDSCH within the second BWP. The UE 902 may receive the second SIB in the PDSCH within the second BWP. In some aspects, to receive the second SIB, the UE may perform blind detection to identify the second SIB by assuming a location of the second BWP based on a location of the first BWP.

In some aspects, for example at 916, the UE 902 may obtain system information. The UE 902 may obtain the system information by decoding at least one of the subset of first SIB and the second SIB. In some aspects, the UE 902 may decode the subset of the first SIB and the second SIB. The UE may combine at least a portion of the decoded subset of the first SIB with the second SIB. In some aspects, the system information may be associated with a SIB (e.g., SIB1). The system information may be associated with many different SIBs and the disclosure is not intended to be limited to the system information being associated with SIB1.

In some aspects, the UE may combine DMRS within a portion of the first BWP that may include the subset of the first SIB and the second BWP that includes the second SIB. In some aspects, the UE may perform channel estimation based on the combined DMRS. The decoding of the subset of the first SIB and the second SIB may be based on the channel estimation.

In some aspects, the UE may receive first DCI in a PDCCH within a subset of a first CORESET. The first CORESET may be within the first BWP. The subset of the first CORESET may be within the second BWP. The subset of the first SIB may be received based on the received first DCI. In some aspects, the UE may receive a second DCI in the PDCCH within a second CORESET. The second CORESET may be within the second BWP. The second SIB may be received based on the received second DCI. In some aspects, the UE may decode the first DCI and the second DCI. The UE may combine at least a portion of the decoded first DCI with the decoded second DCI to obtain the combined DCI. The second SIB may include system information that is the same as the system information of the first SIB.

In some aspects, for example at 918, the base station 904 may send information indicating a plurality of CORESETs. The UE 902 may receive information indicating a plurality of CORESETs. A first CORESET of the plurality of CORESETs may be within the first BWP. A second CORESET of the plurality of CORESETs may be within the second BWP. In some aspects, the first CORESET may overlap in at least one of time or frequency with the second CORESET, with non-overlapping searching spaces for the PDCCH or overlapping searching spaces for the PDCCH with a different identifier (ID) for a SIB. In some aspects, the first CORESET does not overlap with the second CORESET. An overlapping search space may include a search space that occurs concurrently in time or frequency. A non-overlapping search space does not occur concurrently in time or frequency, such that the search spaces is separated by time or frequency.

In some aspects, for example at 920, the base station 904 may send DCI in a PDCCH. The UE 902 may receive the DCI in the PDCCH. The UE 902 may receive the DCI in the PDCCH within the second CORESET.

In some aspects, for example at 922, the base station 904 may send a first additional system information. The UE 902 may receive the first additional system information. The UE may receive the first additional system information within a PDSCH within the second BWP. The UE may receive the first additional system information based on the received DCI. In some aspects, the first additional system information may be associated with one or more SIBs x, where x>1. In some aspects, the UE may receive a second additional system information within the PDSCH within the second BWP. The UE may receive the second additional system information based on the received DCI. In some aspects, the UE may combine the first additional system information and the second additional system information to obtain one set of the additional system information. The configuration of the second BWP for the second additional system information may be different from the configuration of the second BWP for the first additional system information.

Figure 10:
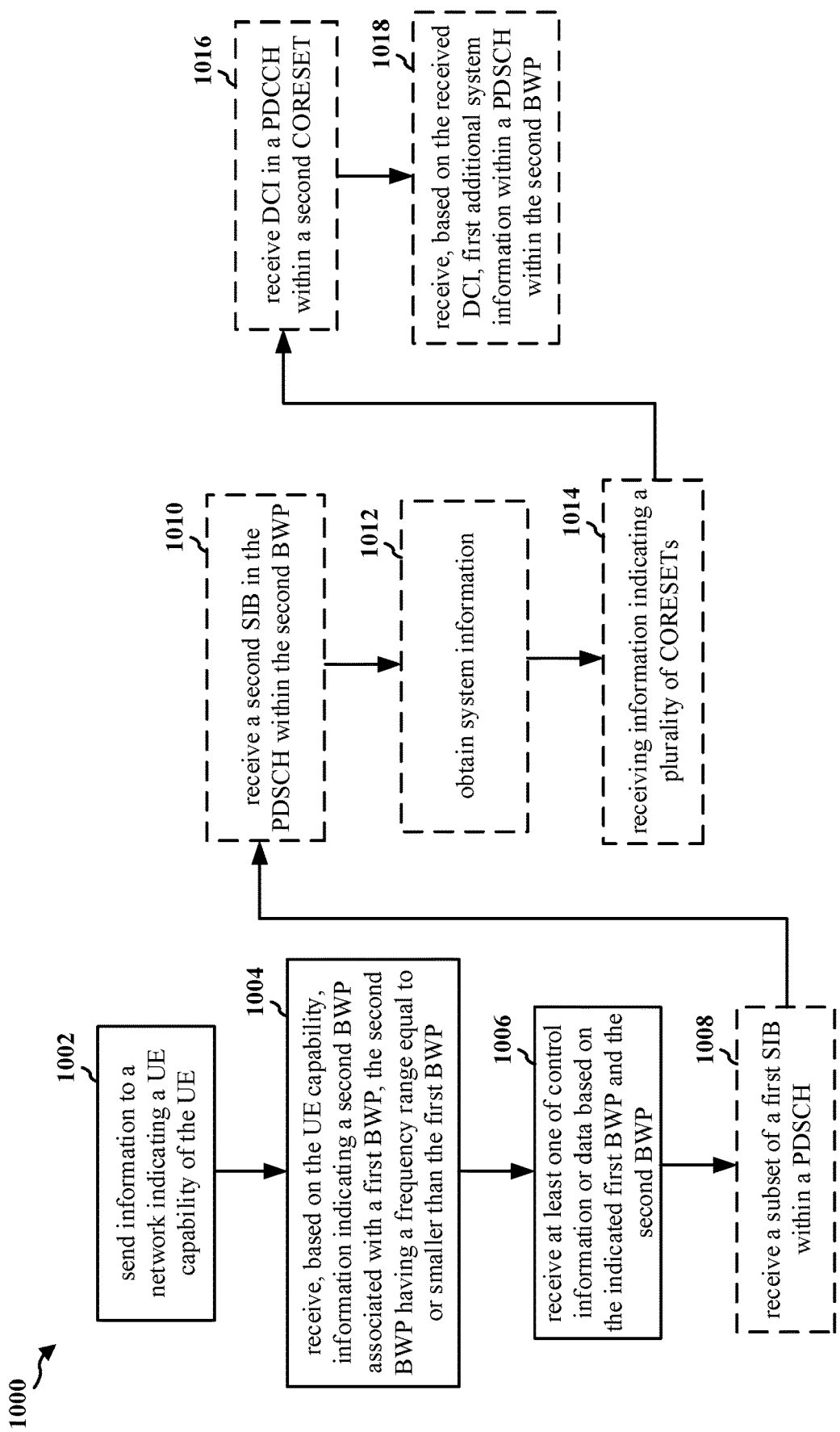
FIG. 10 is a flowchart of a method of wireless communication.

FIG. 10 is a flowchart 1000 of a method of wireless communication. The method may be performed by a UE (e.g., the UE 104, 902; the apparatus 1102; the cellular baseband processor 1104, which may include the memory 360 and which may be the entire UE 350 or a component of the UE 350, such as the Tx processor 368, the RX processor 356, and/or the controller/processor 359). One or more of the illustrated operations may be omitted, transposed, or contemporaneous. Optional aspects are illustrated with a dashed line. The method may allow a UE to receive a BWP configuration that supports RC NR.

At 1002, the UE may send information indicating a UE capability. For example, 1002 may be performed by UE capability component 1140 of apparatus 1102. The UE may send the information indicating the UE capability to a network. The information may indicate that the UE capability is a type of UE with RC. The UE may send the information indicating the UE capability to the network via a base station.

At 1004, the UE may receive information indicating a second BWP associated with a first BWP. For example, 1004 may be performed by reception component 1130 of apparatus 1102. The UE may receive the information indicating the second BWP based on the UE capability. The second BWP may have a frequency range that may be equal to or less than the first BWP.

At 1006, the UE may receive at least one of control information or data. For example, 1006 may be performed by reception component 1130 of apparatus 1102. The UE may receive at least one of the control information or the data based on the indicated first BWP and the second BWP. In some aspects, to receive the at least one of the control information or the data based on the indicated first BWP and the second BWP, the UE may receive DCI in a PDCCH within a CORESET. The CORESET may be within the second BWP. The UE may also receive, based on the received DCI, data in a PDSCH within the second BWP.

In some aspects, for example at 1008, the UE may receive a subset of a first SIB within a PDSCH. For example, 1008 may be performed by reception component 1130 of apparatus 1102. The first SIB may be within the first BWP. The subset of the first SIB may be within the second BWP.

In some aspects, for example at 1010, the UE may receive a second SIB in the PDSCH within the second BWP. For example, 1010 may be performed by reception component 1130 of apparatus 1102. In some aspects, to receive the second SIB, the UE may perform blind detection to identify the second SIB by assuming a location of the second BWP based on a location of the first BWP.

In some aspects, for example at 1012, the UE may obtain system information. For example, 1012 may be performed by SI component 1142 of apparatus 1102. The UE may obtain the system information by decoding at least one of the subset of first SIB and the second SIB.

In some aspects, the UE may decode the subset of the first SIB and the second SIB. The UE may combine at least a portion of the decoded subset of the first SIB with the second SIB. In some aspects, the system information may be associated with a SIB1 (e.g., SIB1). The system information may be associated with many different SIBs and the disclosure is not intended to be limited to the system information being associated with SIB1.

In some aspects, the UE may combine DMRS within a portion of the first BWP that may include the subset of the first SIB and the second BWP that includes the second SIB. In some aspects, the UE may perform channel estimation based on the combined DMRS. The decoding of the subset of the first SIB and the second SIB may be based on the channel estimation.

In some aspects, the UE may receive first DCI in a PDCCH within a subset of a first CORESET. The first CORESET may be within the first BWP. The subset of the first CORESET may be within the second BWP. The subset of the first SIB may be received based on the received first DCI. In some aspects, the UE may receive a second DCI in the PDCCH within a second CORESET. The second CORESET may be within the second BWP. The second SIB may be received based on the received second DCI. In some aspects, the UE may decode the first DCI and the second DCI. The UE may combine at least a portion of the decoded first DCI with the decoded second DCI to obtain the combined DCI. The second SIB may include system information that is the same as the system information of the first SIB.

In some aspects, for example at 1014, the UE may receive information indicating a plurality of CORESETs. For example, 1014 may be performed by reception component 1130 of apparatus 1102. A first CORESET of the plurality of CORESETs may be within the first BWP. A second CORESET of the plurality of CORESETs may be within the second BWP. In some aspects, the first CORESET may overlap in at least one of time or frequency with the second CORESET, with non-overlapping searching spaces for the PDCCH or overlapping searching spaces for the PDCCH with a different identifier (ID) for a SIB. In some aspects, the first CORESET does not overlap with the second CORESET.

In some aspects, for example at 1016, the UE may receive DCI in a PDCCH. For example, 1016 may be performed by reception component 1130 of apparatus 1102. The UE may receive the DCI in the PDCCH within the second CORESET.

In some aspects, for example at 1018, the UE may receive a first additional system information. For example 1018 may be performed by reception component 1130 of apparatus 1102. The UE may receive the first additional system information within a PDSCH within the second BWP. The UE may receive the first additional system information based on the received DCI. In some aspects, the first additional system information may be associated with one or more SIBs x, where x>1. In some aspects, the UE may receive a second additional system information within the PDSCH within the second BWP. The UE may receive the second additional system information based on the received DCI. In some aspects, the UE may combine the first additional system information and the second additional system information to obtain one set of the additional system information. The configuration of the second BWP for the second additional system information may be different from the configuration of the second BWP for the first additional system information.

Figure 11:
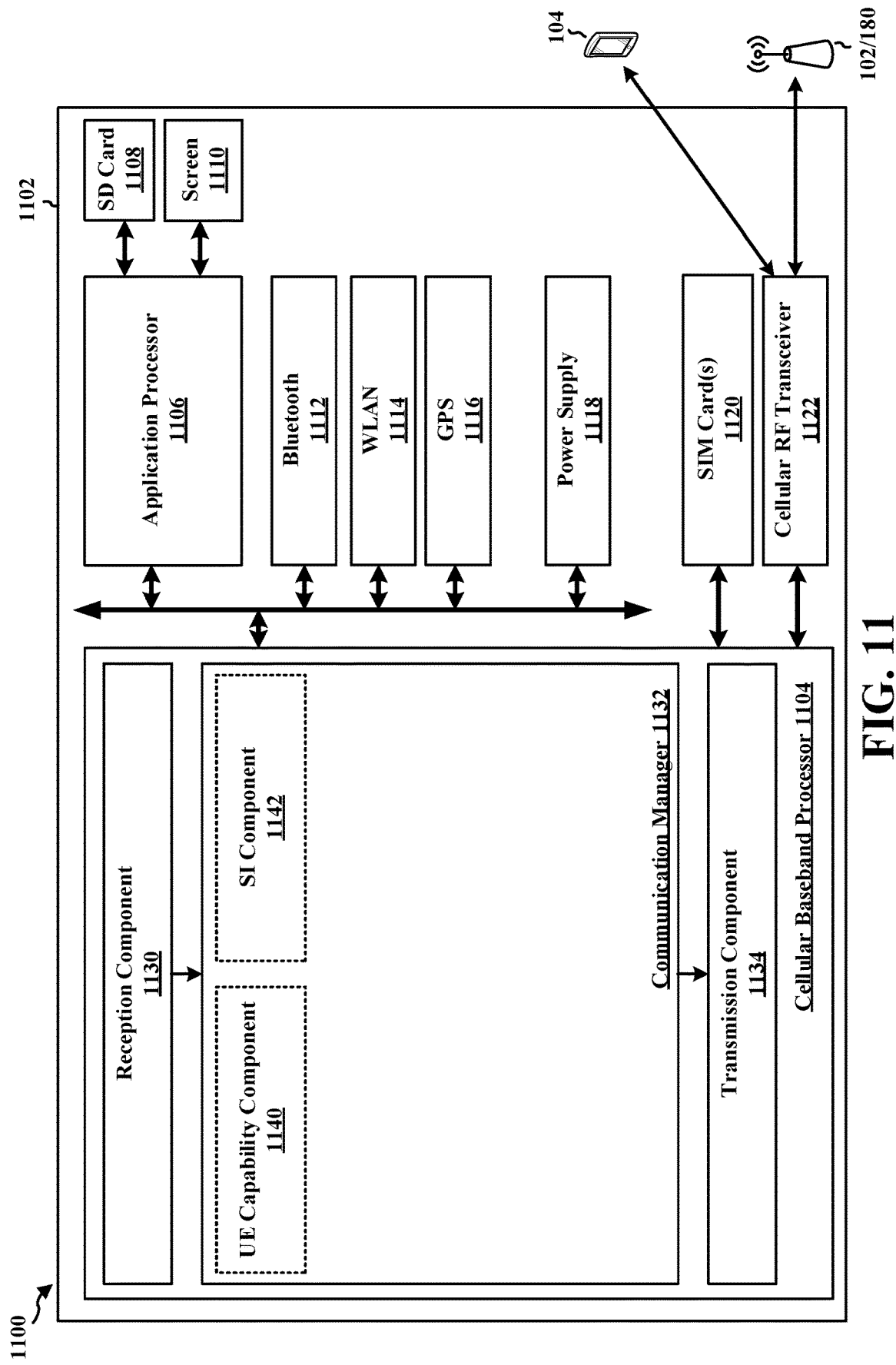
FIG. 11 is a diagram illustrating an example of a hardware implementation for an example apparatus.

FIG. 11 is a diagram 1100 illustrating an example of a hardware implementation for an apparatus 1102. The apparatus 1102 is a UE and includes a cellular baseband processor 1104 (also referred to as a modem) coupled to a cellular RF transceiver 1122 and one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, and a power supply 1118. The cellular baseband processor 1104 communicates through the cellular RF transceiver 1122 with the UE 104 and/or BS 102/180. The cellular baseband processor 1104 may include a computer-readable medium/memory. The computer-readable medium/memory may be non-transitory. The cellular baseband processor 1104 is responsible for general processing, including the execution of software stored on the computer-readable medium/memory. The software, when executed by the cellular baseband processor 1104, causes the cellular baseband processor 1104 to perform the various functions described supra. The computer-readable medium/memory may also be used for storing data that is manipulated by the cellular baseband processor 1104 when executing software. The cellular baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the cellular baseband processor 1104. The cellular baseband processor 1104 may be a component of the UE 350 and may include the memory 360 and/or at least one of the TX processor 368, the RX processor 356, and the controller/processor 359. In one configuration, the apparatus 1102 may be a modem chip and include just the baseband processor 1104, and in another configuration, the apparatus 1102 may be the entire UE (e.g., see 350 of FIG. 3) and include the aforediscussed additional modules of the apparatus 1102.

The communication manager 1132 includes a UE capability component 1140 that is configured to send information indicating a UE capability, e.g., as described in connection with 1002 of FIG. 10. The communication manager 1132 further includes an SI component 1142 that is configured to obtain system information, e.g., as described in connection with 1012 of FIG. 10. The reception component 1130 may be configured to receive information indicating a second BWP associated with a first BWP, e.g., as described in connection with 1004 of FIG. 10. The reception component 1130 may be configured to receive at least one of control information or data, e.g., as described in connection with 1006 of FIG. 10. The reception component 1130 may be configured to receive a subset of a first SIB within a PDSCH, e.g., as described in connection with 1008 of FIG. 10. The reception component 1130 may be configured to receive a second SIB in the PDSCH within the second BWP, e.g., as described in connection with 1010 of FIG. 10. The reception component 1130 may be configured to receive information indicating a plurality of CORESETs, e.g., as described in connection with 1014 of FIG. 10. The reception component 1130 may be configured to receive DCI in a PDCCH, e.g., as described in connection with 1016 of FIG. 10. The reception component 1130 may be configured to receive a first additional system information, e.g., as described in connection with 1018 of FIG. 10.

The apparatus may include additional components that perform each of the blocks of the algorithm in the aforementioned flowchart of FIG. 10. As such, each block in the aforementioned flowchart of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1102, and in particular the cellular baseband processor 1104, includes means for sending information to a network indicating a UE capability of the UE. The apparatus includes means for receiving, based on the UE capability, information indicating a second BWP associated with a first BWP. The second BWP having a frequency range equal to or less than the first BWP. The apparatus includes means for receiving at least one of control information or data based on the indicated first BWP and the second BWP. The apparatus may further include means for receiving a subset of a first SIB within a PDSCH, the first SIB being within the first BWP. The subset of the first SIB being within the second BWP. The apparatus may further include means for receiving a second SIB in the PDSCH within the second BWP. The apparatus may further include means for obtaining system information in the subset of the first SIB and the second SIB by decoding the subset of first SIB and the second SIB, and combining the decoded subset of the first SIB and the decoded second SIB. The apparatus may further include means for combining DMRS within a portion of the first BWP that includes the subset of the first SIB and the second BWP that includes the second SIB. The apparatus may further include means for performing channel estimation based on the combined DMRS. The apparatus may further include means for receiving first DCI in a PDCCH within a subset of a first CORESET. The first CORESET being within the first BWP. The subset of the first CORESET being within the second BWP. The subset of the first SIB being received based on the received first DCI. The apparatus may further include means for receiving second DCI in the PDCCH within a second CORESET. The second CORESET being within the second BWP. The second SIB being received based on the received second DCI. The apparatus may further include means for decoding the first DCI and the second DCI. The apparatus may further include means for combining at least a portion of the decoded first DCI with the decoded second DCI to obtain combined DCI. The apparatus may further include means for receiving information indicating a plurality of CORESETs, a first CORESET of the plurality of CORESETs being within the first BWP, a second CORESET of the plurality of CORESETs being within the second BWP. The apparatus may further include means for receiving DCI in a PDCCH within the second CORESET. The apparatus may further include means for receiving, based on the received DCI, first additional system information within a PDSCH within the second BWP. The apparatus may further include means for receiving, based on the received DCI, second additional system information within the PDSCH within the second BWP. The apparatus may further include means for combining the first additional system information and the second additional system information to obtain one set of the additional system information. The apparatus may further include means for receiving DCI in a PDCCH within a CORESET. The CORESET being within the second BWP. The apparatus may further include means for receiving, based on the received DCI, data in a PDSCH within the second BWP. The aforementioned means may be one or more of the aforementioned components of the apparatus 1102 configured to perform the functions recited by the aforementioned means. As described supra, the apparatus 1102 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The following examples are illustrative only and may be combined with aspects of other embodiments or teachings described herein, without limitation.

Example 1 is a method of wireless communication of a UE comprising sending information to a network indicating a UE capability of the UE; receiving, based on the UE capability, information indicating a second BWP associated with a first BWP, the second BWP having a frequency range equal to or less than the first BWP; and receiving at least one of control information or data based on the indicated first BWP and the second BWP.

In Example 2, the method of Example 1 further includes receiving a subset of a first SIB within a PDSCH, the first SIB being within the first BWP, the subset of the first SIB being within the second BWP; receiving a second SIB in the PDSCH within the second BWP; and obtaining system information by decoding at least one of the subset of first SIB and the second SIB.

In Example 3, the method of Example 1 or 2 further includes decoding the subset of the first SIB and the second SIB; and combining at least a portion of the decoded subset of the first SIB with the second SIB.

In Example 4, the method of any of Examples 1-3 further includes that the receiving the second SIB comprises performing blind detection to identify the second SIB by assuming a location of the second BWP based on a location of the first BWP.

In Example 5, the method of any of Examples 1-4 further includes combining demodulation reference signals (DMRS) within a portion of the first BWP that includes the subset of the first SIB and the second BWP that includes the second SIB; and performing channel estimation based on the combined DMRS, wherein the decoding the subset of the first SIB and the second SIB is based on the channel estimation.

In Example 6, the method of any of Examples 1-5 further includes receiving first downlink control information (DCI) in a physical downlink control channel (PDCCH) within a subset of a first control resource set (CORESET), the first CORESET being within the first BWP, the subset of the first CORESET being within the second BWP, the subset of the first SIB being received based on the received first DCI; and receiving second DCI in the PDCCH within a second CORESET, the second CORESET being within the second BWP, the second SIB being received based on the received second DCI.

In Example 7, the method of any of Examples 1-6 further includes decoding the first DCI and the second DCI; and combining at least a portion of the decoded first DCI with the decoded second DCI to obtain combined DCI.

In Example 8, the method of any of Examples 1-7 further includes that the second SIB includes a same system information as the first SIB.

In Example 9, the method of any of Examples 1-8 further includes receiving information indicating a plurality of CORESETs, a first CORESET of the plurality of CORESETs being within the first BWP, a second CORESET of the plurality of CORESETs being within the second BWP; receiving DCI in a PDCCH within the second CORESET; and receiving, based on the received DCI, first additional system information within a PDSCH within the second BWP.

In Example 10, the method of any of Examples 1-9 further includes that the first additional system information is associated with one or more SIBs x, where x>1.

In Example 11, the method of any of Examples 1-10 further includes that the first CORESET is overlapping in at least one of time or frequency with the second CORESET, with non-overlapping searching spaces for the PDCCH or overlapping searching spaces for the PDCCH with a different ID for a SIB.

In Example 12, the method of any of Examples 1-11 further includes that the first CORESET is non-overlapping with the second CORESET.

In Example 13, the method of any of Examples 1-12 further includes receiving, based on the received DCI, second additional system information within the PDSCH within the second BWP; and combining the first additional system information and the second additional system information to obtain one set of the additional system information.

In Example 14, the method of any of Examples 1-13 further includes that the configuration of the second BWP for the second additional system information is different from the configuration of the second BWP for the first additional system information.

In Example 15, the method of any of Examples 1-14 further includes that the receiving the at least one of control information or the data based on the indicated first BWP and the second BWP; receiving DCI in a PDCCH within a CORESET, the CORESET being within the second BWP; and receiving, based on the received DCI, data in a PDSCH within the second BWP.

Example 16 is a device including one or more processors and one or more memories in electronic communication with the one or more processors storing instructions executable by the one or more processors to cause the system or apparatus to implement a method as in any of Examples 1-15.

Example 17 is a system or apparatus including means for implementing a method or realizing an apparatus as in any of Examples 1-15.

Example 18 is a non-transitory computer readable medium storing instructions executable by one or more processors to cause the one or more processors to implement a method as in any of Examples 1-15.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), comprising:
receiving information indicating a second bandwidth part (BWP) associated with a first BWP, the second BWP having a frequency range less than the first BWP and corresponding to a UE capability;
receiving a subset of a first system information block (SIB) within a physical downlink shared channel (PDSCH), the first SIB being within the first BWP, the subset of the first SIB being within the second BWP;
receiving a second SIB in the PDSCH within the second BWP; and
obtaining system information by decoding at least one of the subset of first SIB and the second SIB.

2. The method of claim 1, further comprising:
decoding the subset of the first SIB and the second SIB; and
combining at least a portion of the decoded subset of the first SIB with the second SIB.

3. The method of claim 1, wherein the receiving the second SIB comprises performing blind detection to identify the second SIB by assuming a location of the second BWP based on a location of the first BWP.

4. The method of claim 1, further comprising:
combining demodulation reference signals (DMRS) within a portion of the first BWP that includes the subset of the first SIB and the second BWP that includes the second SIB; and
performing channel estimation based on the combined DMRS,
wherein the decoding the subset of the first SIB and the second SIB is based on the channel estimation.

5. The method of claim 1, further comprising:
receiving first downlink control information (DCI) in a physical downlink control channel (PDCCH) within a subset of a first control resource set (CORESET), the first CORESET being within the first BWP, the subset of the first CORESET being within the second BWP, the subset of the first SIB being received based on the received first DCI; and
receiving second DCI in the PDCCH within a second CORESET, the second CORESET being within the second BWP, the second SIB being received based on the received second DCI.

6. The method of claim 5, further comprising:
decoding the first DCI and the second DCI; and
combining at least a portion of the decoded first DCI with the decoded second DCI to obtain combined DCI.

7. The method of claim 1, wherein the second SIB includes a same system information as the first SIB.

8. A method of wireless communication of a user equipment (UE), comprising:
receiving information indicating a second bandwidth part (BWP) associated with a first BWP, the second BWP having a frequency range less than the first BWP and corresponding to a UE capability;
receiving information indicating a plurality of control resource sets (CORESETs), a first CORESET of the plurality of CORESETs being within the first BWP, a second CORESET of the plurality of CORESETs being within the second BWP;
receiving downlink control information (DCI) in a physical downlink control channel (PDCCH) within the second CORESET; and
receiving, based on the received DCI, first additional system information within a physical downlink shared channel (PDSCH) within the second BWP.

9. The method of claim 8, wherein the first additional system information is associated with one or more SIBs x, where x>1.

10. The method of claim 8, wherein the first CORESET is overlapping in at least one of time or frequency with the second CORESET, with non-overlapping searching spaces for the PDCCH or overlapping searching spaces for the PDCCH with a different identifier (ID) for a system information block (SIB).

11. The method of claim 8, wherein the first CORESET is non-overlapping with the second CORESET.

12. The method of claim 8, further comprising:
receiving, based on the received DCI, second additional system information within the PDSCH within the second BWP; and
combining the first additional system information and the second additional system information to obtain one set of the additional system information.

13. The method of claim 12, wherein a configuration of the second BWP for the second additional system information is different from a configuration of the second BWP for the first additional system information.

14. A method of wireless communication of a user equipment (UE), comprising:
receiving information indicating a second bandwidth part (BWP) associated with a first BWP, the second BWP having a frequency range less than the first BWP and corresponding to a UE capability;
receiving downlink control information (DCI) in a physical downlink control channel (PDCCH) within a control resource set (CORESET), the CORESET being within the second BWP; and
receiving, based on the received DCI, data in a physical downlink shared channel (PDSCH) within the second BWP.

15. An apparatus for wireless communication, the apparatus being a user equipment (UE), comprising:
a memory; and
at least one processor coupled to the memory and configured to:
receive information indicating a second bandwidth part (BWP) associated with a first BWP, the second BWP having a frequency range smaller than the first BWP and corresponding to a UE capability;
receive a subset of a first system information block (SIB) within a physical downlink shared channel (PDSCH), the first SIB being within the first BWP, the subset of the first SIB being within the second BWP;
receive a second SIB in the PDSCH within the second BWP; and
obtain system information by decoding at least one of the subset of first SIB and the second SIB.

16. The apparatus of claim 15, wherein the at least one processor is further configured to:
   decode the subset of the first SIB and the second SIB; and
   combine at least a portion of the decoded subset of the first SIB with the second SIB.

17. The apparatus of claim 15, wherein the at least one processor is configured to receive the second SIB by performing blind detection to identify the second SIB by assuming a location of the second BWP based on a location of the first BWP.

18. The apparatus of claim 15, wherein the at least one processor is further configured to:
   combine demodulation reference signals (DMRS) within a portion of the first BWP that includes the subset of the first SIB and the second BWP that includes the second SIB; and
   perform channel estimation based on the combined DMRS,
   wherein the decoding the subset of the first SIB and the second SIB is based on the channel estimation.

19. The apparatus of claim 15, wherein the at least one processor is further configured to:
   receive first downlink control information (DCI) in a physical downlink control channel (PDCCH) within a subset of a first control resource set (CORESET), the first CORESET being within the first BWP, the subset of the first CORESET being within the second BWP, the subset of the first SIB being received based on the received first DCI; and
   receive second DCI in the PDCCH within a second CORESET, the second CORESET being within the second BWP, the second SIB being received based on the received second DCI.

20. The apparatus of claim 19, wherein the at least one processor is further configured to:
   decode the first DCI and the second DCI; and
   combine at least a portion of the decoded first DCI with the decoded second DCI to obtain combined DCI.

21. The apparatus of claim 15, wherein the second SIB includes a same system information as the first SIB.

22. An apparatus for wireless communication, the apparatus being a user equipment (UE), comprising:
   a memory; and
   at least one processor coupled to the memory and configured to:
      receive information indicating a second bandwidth part (BWP) associated with a first BWP, the second BWP having a frequency range less than the first BWP and corresponding to a UE capability;
      receive information indicating a plurality of control resource sets (CORESETs), a first CORESET of the plurality of CORESETs being within the first BWP, a second CORESET of the plurality of CORESETs being within the second BWP;
      receive downlink control information (DCI) in a physical downlink control channel (PDCCH) within the second CORESET; and
      receive, based on the received DCI, first additional system information within a physical downlink shared channel (PDSCH) within the second BWP.

23. The apparatus of claim 22, wherein the first CORESET is overlapping in one of time or frequency with the second CORESET, with non-overlapping searching spaces for the PDCCH or overlapping searching spaces for the PDCCH with a different identifier (ID) for a system information block (SIB).

24. The apparatus of claim 22, wherein the first CORESET is non-overlapping with the second CORESET.

25. The apparatus of claim 22, wherein the at least one processor is further configured to:
   receive, based on the received DCI, second additional system information within the PDSCH within the second BWP; and
   combine the first additional system information and the second additional system information to obtain one set of the additional system information, wherein a configuration of the second BWP for the second additional system information is different from a configuration of the second BWP for the first additional system information.

26. An apparatus for wireless communication, the apparatus being a user equipment (UE), comprising:
   a memory; and
   at least one processor coupled to the memory and configured to:
      receiving information indicating a second bandwidth part (BWP) associated with a first BWP, the second BWP having a frequency range less than the first BWP and corresponding to a UE capability;
      receive downlink control information (DCI) in a physical downlink control channel (PDCCH) within a control resource set (CORESET), the CORESET being within the second BWP; and
      receive, based on the received DCI, data in a physical downlink shared channel (PDSCH) within the second BWP.

27. An apparatus of wireless communication, the apparatus being a user equipment (UE), comprising:
   means for receiving information indicating a second bandwidth part (BWP) associated with a first BWP, the second BWP having a frequency range equal to or less than the first BWP and corresponding to a UE capability;
   means for receiving a subset of a first system information block (SIB) within a physical downlink shared channel (PDSCH), the first SIB being within the first BWP, the subset of the first SIB being within the second BWP;
   means for receiving a second SIB in the PDSCH within the second BWP; and
   means for obtaining system information by decoding at least one of the subset of first SIB and the second SIB.

28. A computer-readable medium storing computer executable code within a user equipment (UE), the code when executed by a processor cause the processor to:
   receive information indicating a second bandwidth part (BWP) associated with a first BWP, the second BWP having a frequency range equal to or less than the first BWP and corresponding to a UE capability;
   receive a subset of a first system information block (SIB) within a physical downlink shared channel (PDSCH), the first SIB being within the first BWP, the subset of the first SIB being within the second BWP;
   receive a second SIB in the PDSCH within the second BWP; and
   obtain system information by decoding at least one of the subset of first SIB and the second SIB.

* * * * *